(12) United States Patent
Gosselin (10) Patent No.: US 6,220,747 B1
(45) Date of Patent: Apr. 24, 2001

(54) PROPORTIONAL PUMP SYSTEM FOR VISCOUS FLUIDS

(76) Inventor: Michael Gosselin, 227 Hopkins Rd., Baltimore, MD (US) 21212

( * ) Notice: Subject to any disclaimer, the term of this patent is extended or adjusted under 35 U.S.C. 154(b) by 0 days.

(21) Appl. No.: 09/134,029

(22) Filed: Aug. 14, 1998

Related U.S. Application Data (60) Provisional application No. 60/055,651, filed on Aug. 14, 1997.

(51) Int. Cl.[7] .............................. B01F 15/02; B01F 15/04
(52) U.S. Cl. .................................. 366/152.3; 366/152.5; 137/3
(58) Field of Search ............................ 366/152.1, 162.1, 366/151.1, 152.5, 152.3, 152.2, 182.1, 182.2; 137/87.03, 87.04, 3, 9, 10, 12, 14; 73/861.01, 861.02, 861.03, 861.04, 861.71, 54.02; 417/19, 20, 21, 22, 23, 42, 43; 222/1, 57, 55

(56) References Cited

U.S. PATENT DOCUMENTS

| | | |
|---|---|---|
| 3,693,437 * | 9/1972 | Shiba .............................. 73/861.71 |
| 3,786,835 | 1/1974 | Finger . |
| 4,008,829 | 2/1977 | Chandra et al. . |
| 4,209,258 | 6/1980 | Oakes . |
| 4,216,674 * | 8/1980 | Butcher et al. .................... 73/861.01 |
| 4,331,025 * | 5/1982 | Ord, Jr. ............................ 73/861.02 |
| 4,419,898 * | 12/1983 | Zanker et al. ..................... 73/861.02 |
| 4,458,709 | 7/1984 | Springer . |
| 4,475,407 * | 10/1984 | Kruncos ............................ 73/861.01 |
| 4,565,511 | 1/1986 | Ramisch . |
| 4,621,927 * | 11/1986 | Hiroi ................................ 366/152.1 |
| 4,752,211 | 6/1988 | Sabin . |
| 4,807,151 * | 2/1989 | Citron ................................. 364/510 |
| 4,885,938 * | 12/1989 | Higashi ............................. 73/861.02 |
| 4,965,713 * | 10/1990 | Hone et al. ......................... 364/149 |
| 5,033,644 | 7/1991 | Tentler . |
| 5,092,739 | 3/1992 | Gill . |
| 5,143,257 | 9/1992 | Austin et al. . |
| 5,237,523 * | 8/1993 | Bonne et al. .................... 364/571.03 |
| 5,320,424 * | 6/1994 | Annett et al. .................... 366/152.1 |
| 5,343,758 * | 9/1994 | Ingrain et al. .................... 73/861.02 |
| 5,360,320 | 11/1994 | Jameson et al. . |
| 5,423,607 * | 6/1995 | Jones et al. ....................... 366/152.2 |
| 5,480,597 * | 1/1996 | Ishida et al. ..................... 366/152.1 |
| 5,490,726 | 2/1996 | Davis et al. . |
| 5,544,531 * | 8/1996 | Heckman ......................... 73/861.01 |
| 6,029,527 * | 2/2000 | Seitz et al. ....................... 73/861.02 |

* cited by examiner

Primary Examiner—Tony G. Soohoo
(74) Attorney, Agent, or Firm—Royal W. Craig (57) ABSTRACT

A method and apparatus for combining multiple viscous fluids in which a desired, predetermined mixture ratio is automatically maintained by at least one system microcontroller. The microcontroller processes critical data relating to a primary fluid throughout a pumping and dispensing procedure, and automatically adjusts all additional flows based on changes to the primary fluid flow rate, temperature, pressure, viscosity, and pump characteristics by adjusting the speed of the motors driving pumps for all other fluids.

18 Claims, 6 Drawing Sheets

PROPORTIONAL PUMP SYSTEM FOR VISCOUS FLUIDS

CROSS-REFERENCE TO RELATED APPLICATIONS

The present application is based on U.S. provisional application Ser. No. 60/055,651 filed Aug. 14, 1997.

BACKGROUND OF THE INVENTION

1. Field of the Invention

The present invention relates to proportional pump systems for metering viscous fluids and, more particularly, to an improved proportional pumping system that provides for the mixing and dispensing of two or more fluids in a prescribed mix ratio until a batch or steady state rate is attained, regardless of changes in system fluid characteristics.

2. Description of the Background

The problem of mixing and dispensing fluids while maintaining precise volumetric ratios of one fluid to another throughout the mixing/dispensing process arises in the context of many industrial applications. Specifically, there are applications in the fields of resin preparation and dispensing, soft drink dispensing, paint formulation, and liquid chromatography, to name only a few. The required proportions in mixing systems vary greatly depending upon the particular industrial application, as does the need for accuracy. In current viscous fluid mixing apparatus, particular variations in mix accuracy can range anywhere from 0.5% to 1.0%, depending upon the industrial application. Where large volumes of product are at stake, any lapses in mix accuracy can result in large amounts of wasted product and high economic losses. Whether the industrial application is for the mixing of food products, construction products, pharmaceutical products, or any other industrial mixing requirement, maintaining accurate proportions is an economic necessity.

There are a variety of commercial mixing systems, and many factors should be considered when selecting the best for a particular application. For example, the mixing system should be matched to the expected range of flow rates, e.g., is the system configured for filling a five gallon pail or a 5,000 gallon tank? The system should also be able to adjust flow rates when new or unusual conditions are encountered in the pumping system. Often times, a change in influent properties will change the effluent quality of the mix. Because the overall performance of a mixing system is ordinarily measured in terms of the effluent quality, which in turn must be consistent with the user's effluent discharge requirements, it is imperative that mixing systems be able to quickly adapt to system changes so that the required effluent quality may be maintained.

Proportional pumping systems have long attempted to provide for the automatic adjustment of fluid flows in order to maintain a proper proportional flow between the fluids being mixed. Unfortunately, the prior art devices have been unable to achieve the desired level of accuracy in precision mixing and dispensing of highly viscous fluids at large flow rates. One recurring shortcoming lies in achieving the necessary accuracy in flow measurements for highly viscous fluids, due to variations in the absolute and relative pressures of the various system fluids during the dispensing operation. Changes in fluid pressure alter the fluid flow rates individually and with respect to one another, thus changing the ratio of fluids in the final mix. Some fluid mixing systems have attempted to compensate for these pressure changes through manual adjustment of varied flow control apparatus, requiring an operator to vigilantly guard the various flows so that manual adjustments may be made as needed. Other prior art devices have used flow restrictors, such as a flow washer or a metering pin, to control flow rates over limited ranges of pressures. However, flow restrictors do nothing to account for temperature and viscosity variations in the fluid. Still other prior art devices have incorporated a microprocessor to measure flow rates and adjust flow rates at predetermined intervals to maintain a desired proportional flow. These systems attempt to maintain proportional flow rates by measuring and comparing the pressures and velocities of the various flow lines, and use that data to control pumps, valves, or other system components to maintain proportional flows. Unfortunately, such systems are complex, requiring multiple valves, meters, piping, and pumps to measure particular properties of each flow line at various points in order to calculate the proportional flow rates. Such components further increase the disturbance in the flow lines and are prone to damage in systems pumping corrosive chemicals.

For example, U.S. Pat. No. 5,490,726 to Davis et al. discloses a device for controlling the relative ratio of resin to catalyst by adjusting the catalyst (secondary fluid) pressure as a function of the pressure at which the resin (primary fluid) is supplied to dispensers, and by adjusting the duty cycle of a catalyst valve within the catalyst flow path.

U.S. Pat. No. 5,360,320 to Jameson et al. discloses a proportional pumping system for supplying two solvents into a mixer. Pressures are measured in each fluid conduit to generate first and second signals that are proportional to those pressures. Those signals are then compared to the programmed pressure to give an error signal which in turn is multiplied by concentration signals from a programmer to control each pumping rate.

U.S. Pat. No. 5,143,257 to Austin et al. discloses a system for proportional fluid dispensing comprising a solenoid operated pump which discharges controlled amounts of secondary liquid into a main flow. A flow meter sends a signal relating to the main flow rate. An optical pressure sensor sends a signal showing the static pressure of the main flow. Logic circuits combine the flow rate/pressure signals for varying pump operation to maintain the appropriate ratio by controlling the primary flow rate.

U.S. Pat. No. 5,092,739 to Gill discloses an electronic control for a pump comprising input means which receives signals/values for quantities that determine the flow rate to be supplied by a pump. The device has an electronic memory which holds preset values for those quantities and contains stored control signals corresponding to the desired flow rate. The device has output means which supply the appropriate control signal to a pump. The device input consists of data relating to the overall fluid supply job, and the device output consists of the appropriate flow rate calculation which in turn generates a pump control signal.

U.S. Pat. No. 5,033,644 to Tentler discloses a device for dispensing varying viscosity fluids in proper ratios whereby flow rates of the fluids are sensed by flowmeters, and a pressure-sensing feedback circuit allows the proper proportioning of flows. The proportioning of fluids may be changed either by specific user action or by programming a new desired ratio.

It is noteworthy that the above-referenced patents monitor only one or two fluid properties such as pressure, and adjust the catalyst flow path accordingly based on percentage change. For instance, the '644 patent accounts for variations in the flow rate by changes in fluid parameters, e.g., slip (pressure drop) or pressure differentials (increase heads, changes in temperature, or in-line restrictions). This is inadequate because the secondary fluid will correspond to the change and either increase or decrease by percentage according to preset proportions. Changes to system fluid viscosity are a significant source of error in maintaining a proper proportion of fluids in a final product. Highly viscous fluids, such as resins, retain a high dependence on temperature. Because ordinary mixing and dispensing procedures involve numerous sources of temperature change, system fluids which are temperature sensitive will regularly experience a change in viscosity. Such a change in viscosity will be accompanied by a change in flow rate if the same amount of pumping pressure is applied to the fluid.

Thus, there remains a need to be able to instantaneously modify the system flow rates when a change in viscosity is realized in order to maintain the desired proportions of fluids. In addition, the flow rate of the secondary fluid should be controlled based on all critical fluid flow properties such that a proper proportional flow may be maintained between any number of various fluids, and should provide for changes in viscosity of a system fluid.

The foregoing is particularly true of the Cured In Place Pipe (CIPP) industry in which piping systems are repaired through the application of resin compounds to damaged pipe surfaces while the pipes remain buried underground. The steps of the CIPP process are generally as follows:

Step 1: Resin saturated liner is installed in an existing pipe through a manhole or the like.

Step 2: Water is used to fill and invert the liner within the pipe and is continually added to maintain a constant pressure. The water pressure keeps the liner pressed tightly against the walls of the pipe.

Step 3: The water in the pipe is circulated through a heat exchanger where it is heated and returned to the pipe. The hot water cures the thermosetting resin, causing it to harden into a structurally sound, jointless pipe-within-a-pipe.

Step 4: Water pressure is released and the liner is trimmed and cut with a remote control cutting device or man-entry techniques. The lined pipe is ready for immediate use with no excavation whatsoever.

A variety of resins may be used to repair pipes during the above-described CIPP process. The application for impregnation consists mainly of polyesters or vinyl esters and utilize a thin or less viscous catalyst. A typical ratio of resin to catalyst to secondary catalyst or promoter during the CIPP process is around 100:1:0.5 by weight. Other resins, such as epoxies, require the use of curing agents which range from low viscosity to high viscosity. For the application of epoxies, ratios of resin to curing agent may range from 2:1 to 100:4 by weight. Thus, an epoxy system may have a viscous primary fluid resin and either a slightly viscous secondary fluid curing agent or a highly viscous secondary fluid curing agent. The prior art devices have not been able to provide a versatile system that could accurately control the flow characteristics of such systems having numerous viscous fluids.

These variations between system fluid viscosities aggravate the problem of dispensing both resin and catalyst together while maintaining a precisely prescribed mix ratio over a range of temperatures, and over a corresponding range of fluid viscosities. Shell Oil Company has published a document entitled "Epon Resin Systems for In-Place Pipe Rehabilitation" which gives an excellent overview of the CIPP industry, including fluid characteristics of epoxies and epoxy curing agents, and industry specific needs and requirements, and a CIPP application newsletter and charts explaining the viscosity/temperature relationship for resins used in the CIPP industry. As shown in that publication, the highly viscous resins used in the CIPP industry show a logarithmic relationship to temperature, wherein a small reduction in operating temperature below 75° F. will result in a large increase in fluid viscosity. Often in the CIPP application, the temperature of the resin during system operation is maintained at approximately 70° F. At this temperature, any slight change in temperature will result in a large change in fluid viscosity, and therefore in fluid flow rate, thus aggravating the problem of attempting to accurately regulate and control proportional amounts of fluid being dispensed. These variations in fluid viscosity in turn cause variations in the signal outputs of prior viscosity-sensitive flow metering devices, which likewise results in a correspondingly undesirable error in mixing proportions.

A particular source of temperature variation exists in the form of the shear forces exerted on a fluid by the pump. The shear forces applied to the system fluid depend on the particular pump configuration and the differential pressure applied to the fluid as it travels through the pump. Shear forces are evidenced by the addition of heat to a viscous fluid, as heat is generated from frictional forces within the fluid as it escapes its intended flow path through the pump (i.e., pump slip). The heat transfer causes temperature fluctuations which again alter the fluid viscosity, thus effecting the accuracy of flow monitoring and control. Unfortunately, the prior art devices do not account for these temperature and viscosity variations, and are therefore unable to achieve the necessary level of accuracy for precise fluid mixing applications.

Accordingly, it would be a great advantage to provide a proportional fluid pumping and dispensing system which allows the accurate proportional mixing of fluids having differing viscosities regardless of changes in pressure or viscosity in the fluids. It would be another advantage to provide such a system that would function accurately regardless of temperature fluctuations in the system fluids which would in turn effect fluid viscosities. It would be another advantage to provide such a system which could be readily operated by unskilled personnel who could input the necessary fluid parameters for any fluid and operate the system without the need for continual inspection or manual adjustment. It would be yet another advantage to provide such a system that is readily adaptable to particular applications, allowing for the mixing of any number of fluids of any viscosity. It would be yet another advantage to obtain large flow rates at low RPM's that would lessen shear forces, and thus the addition of heat, and product thinning would be minimized.

SUMMARY OF THE INVENTION

It is, therefore, an object of the present invention to provide a method and apparatus for intermixing multiple fluids of varied viscosities which provides for accurate control of each fluid at relatively high flow rates, maintains the pump inlet fluid characteristics near or at the pump outlet fluid characteristics, and which provides for accurate and immediate adjustment of flow rates whenever necessary in order to maintain a desired final proportional mix of the various fluids, regardless of fluctuations in fluid properties.

These objectives are accomplished in a method and apparatus for combining multiple viscous fluids to form a material formulation. The fluids are transmitted through separate but related flow paths to at least one in-line mixer in which they are combined to form a final product having a predetermined mixed formulation. The present invention provides for the measuring and dispensing of viscous fluids through a static mixer at a programmable or manually set flow rate by measuring, among other factors, the differential pressure and pump outlet fluid temperature of the primary fluid. Preset proportions of all other fluids to be pumped into the system are continuously monitored by a flow transmitter and a slave controller, or alternatively by a separate microcontroller. Alternatively, pressure and temperature monitors can be used if the other fluids are viscous or are inclined to shear at the pump section. In this case, multiple interconnecting microcontrollers are used to monitor and adjust for differentials in each of the viscous secondary fluids in order to maintain a precisely accurate mixture. Thus, the output from the primary flow line microcontroller serves as an input signal to the secondary fluid microcontroller, which simultaneously collects and analyzes all critical flow characteristics of the secondary flow line to properly proportion the flow through the secondary pump to the flow through the primary pump. Any number of additional microcontrollers are likewise added to the system to precisely control the mix of any number of viscous fluids.

When pumping viscous fluids, shear forces placed on the fluid from the pump create a difficult situation in attempting to monitor and control the fluid flow rates. The extent of the shear forces applied to the fluid are dependent upon the pump selection and the differential pressure applied to the fluid. Shear forces are evidenced by an addition of heat to the viscous fluid, as heat is generated within the fluid as it escapes from its intended flow path through the pump. These shear forces cause temperature fluctuations which in turn change the fluid viscosity, likewise affecting the overall accuracy of flow monitoring. Ultimately, the less shear that is applied to a viscous fluid, the greater the accuracy that will be achieved in monitoring and adjusting for changing flow rates in midstream. Thus, the present invention seeks to allow for the pumping, mixing and dispensing of multiple viscous fluids not only at any fixed flow rate, but at any flow rate required by the operator, including variable flow rates during system operations.

The pumps in fluid mixing systems will often allow the system fluid to bypass its intended flow path due to the particular gear sets used in the pump. The system fluid acts as a lubricant and a sealant between the pump components, creating a suction force and a differential pressure. As a viscous fluid experiences this "slip" phenomenon, the fluid experiences shear forces which result in even greater variations in fluid temperatures and viscosities. In fact, any fluid will shear and bypass the pump gears if the gear rotation is sufficiently high, or if insufficient head is supplied to the pump, and in turn cause pump cavitation. Pump cavitation even further complicates the measurement and maintenance of an accurate flow rate.

Devices which have attempted in the past to measure fluid viscosities in flowing fluids have done so using expensive equipment and have experienced an associated high maintenance cost. These systems have required extra piping, valves, and flowmeters which restrict fluid flow, thus adding back pressure to the system and increasing wear and tear on the pump components. These complications further add to the problem of fluid slip or bypassing around the pump components. The present invention therefore also seeks to monitor the viscosity of flowing viscous fluids and adjust the flows as necessary while avoiding the fluid slip and back pressure problems inherent in the complex prior art devices.

To achieve these purposes, the present invention monitors variations in fluid differential pressure at the pump inlet and outlet, and temperature at the pump outlet, in order to increase the accuracy of monitoring the flow across the pump. The present invention additionally monitors motor RPM's to determine slip of the pump, which in turn can add to greater shear forces on the fluid. The present invention incorporates a positive displacement pump which is of the class of pumps which deliver a pulsating or periodic flow as the pump cavity opens, traps, and then squeezes the fluid. A positive displacement pump provides a strong advantage of allowing the delivery of any fluid regardless of viscosity.

The system of the present invention is monitored by a manually programmable microcontroller, and the system parameters may be adjusted as needed by inputting critical fluid data and pump characteristics into the microcontroller. All fluid properties, including specific gravity, temperatures and viscosity are assigned designated high and low points, and those values are downloaded or manually input into the microcontroller. Additionally, pump characteristics including pump drive information, motor RPM's (i.e., nameplate motor speed of the pump), power line frequency, and the drive reduction ratio are also input to the microprocessor, enabling the microcontroller to adjust the motor RPM's by means of a variable frequency drive to ensure proper throughput as the pump wears. By analyzing this combination of measurements, the pumping system can accurately monitor the flow of any viscous fluid with greater accuracy than the prior art devices.

In a first embodiment of the invention, the data which is collected from the primary flow line is processed by the microcontroller which in turn outputs a signal to a slave controller for the motor of a secondary fluid pump for pumping a secondary fluid which is not prone to large viscosity variations. The microcontroller evaluates and processes the data from the primary flow line in order to calculate the necessary adjustment to the secondary flow pump which will maintain the final product at the desired mix ratio. To ensure that the secondary flow is maintained at the required proportional level to the primary flow, a feedback circuit operates between the slave controller and a flow transmitter on the secondary fluid line. The flow transmitter may also output a signal to a control panel to shut down the entire system when no fluid flows through the secondary line for some predetermined period of time.

Alternatively, if additional viscous fluids are to be added to the system, additional microcontrollers may be used to monitor and analyze fluid characteristics in those secondary viscous lines again to maintain a proper flow rate in response to changes in both the primary flow line and in the secondary fluid itself.

Thus, the proportional pumping system of the present invention is able to withstand process upset and automatically changes the flow rates as necessary to maintain proportional flow rates without affecting the final effluent quality.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

A. System Configuration

Figure 1:
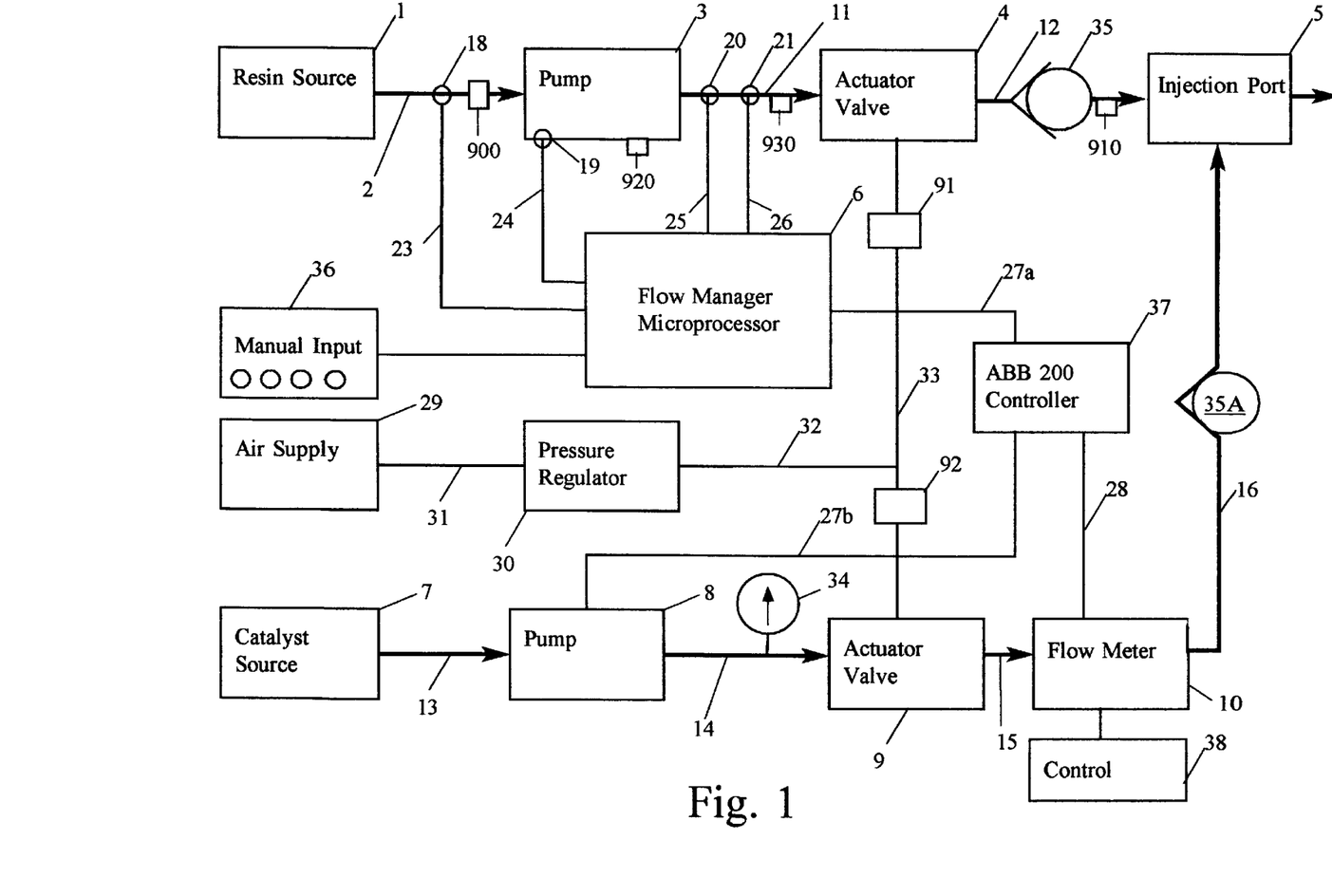
FIG. 1 is a schematic block diagram of one embodiment of the apparatus of this invention.

FIG. 1 is a schematic block diagram of a proportionate metering system according to one embodiment of the present invention.

The top portion of the drawing shows a viscous resin flow path including a resin source 1 from which resin is drawn and delivered to an injection port 5. The bottom portion of the drawing shows a non-viscous catalyst flow path including a catalyst source 7 from which catalyst is drawn and delivered to the injection port 5 for combining with the resin flow. From the injection port, the combined resin/catalyst mixture is delivered to a static mixer (not shown), and from there to a dispenser for delivery of an active resin mixture. The resin source 1 and catalyst source 7 may be any type of conventional storage container (e.g., bulk tank, tank wagon, totes and/or drums).

Shown between the resin flow path and the catalyst flow path is a flow manager microcontroller 6 which directs a proportional signal to a slave controller 37, which in turn controls a variable frequency drive for the motor of catalyst pump 8 in a manner described in detail below.

Also shown in the middle portion of the drawing is an air flow path including an air supply 29 which delivers air through flow line 31 to pressure regulator 30, and onward through flow lines 32 and 33 to electrically operated solenoid switches 91 and 92, and onward to the respective actuator valves 4 and 9. A presently preferred pressure regulator is commercially available from the Wilkerson™ Corporation, under Model No. R00. Pressure regulator 30 serves to minimize the pressure delivered to electric solenoid switches 91 and 92 which selectively open and close actuator valves 4 and 9, respectively. Air is thus delivered through line 33 to each of the resin flow line and the catalyst flow line to operate actuator valves 4 and 9 upon the start of resin pumping. Air may alternatively bypass the pressure regulator 30 such that air from air supply 29 may be used to blow out excess material from the pumping system after the pumping and mixing operation has been completed. For this purpose, air quick disconnects 900, 910 are provided at the resin or other primary fluid pump inlet, and after the back flow protector but before the catalyst injection port. Bleed or drain ports 920, 930, and 940 are also provided at the lowest part of the primary fluid pump, before the actuator valve in the primary flow line, and after the actuator valve in the primary flow line.

In operation, when pump 3 is actuated, resin from the resin source 1 is directed through resin supply line 2 to pump 3. It is important to properly size pump 3 for the particular industrial application in which it is to be used. Different sized pumps or pump material (e.g., stainless steel, carbon steel, etc.) will vary in the amount of heat that is added to a system fluid during pumping operations, through the above-described pump slip phenomenon, through the RPM's necessary to achieve a desired flow rate, and through corrosive chemical applications. It is therefore advantageous to select a pump for a viscous fluid of appropriate size to minimize the RPM's required to achieve high flow rates. A preferred pump 3 for viscous resins is commercially available from Viking Pump, Inc. of Cedar Falls, Iowa under Model No. LS125R. This is an internal gear positive displacement pump with B size reducer and 10 hp, TEFC 460/3/60 inverter dry rated motor. Pump 3 is designed to handle from 60–600 lb/min or from 6–60 gallons/min of resin having a viscosity range of from 2,500–10,000 centipoise with a discharge pressure of up to 100 psi, flooded suction. Resin is emitted from pump 3 into resin flow line 11 where it passes through actuator valve 4, through backflow protector 35, and onward to injection port 5 where the resin is injected with catalyst. Following the injection of catalyst into the resin flow line, the mixture proceeds onward to a static mixer (not shown). Air supply 29 is electrically connected to a solenoid start switch on microprocessor 6 for actuation thereby so that immediately upon initiating operation of pumps 3 and 8, air supply 29 is opened to deliver air through pressure regulator 30 and on to solenoid switches 91 and 92 which deliver air to actuator valve 4 in the resin flow path and actuator valve 9 in the catalyst flow path, respectively. Suitable actuator valves are commercially available from Honeywell Inc. of New Britain, Conn. under Model No. 7131T.

Resin flow line 12 is equipped with a backflow protection device 35 between actuator valve 4 and injection port 5 which may be any suitable device that will close the resin flow line when minimal fluid pressure is applied. For example, a simple 2 inch carbon steel or stainless steel hinged plate 35 may be provided within the primary flow line to freely open when pressure is applied from fluid flowing in its preferred direction (toward injection port 5), and closing when that fluid pressure is decreased, or when a greater pressure is exerted in the opposite direction. Thus, the backflow protection device 35 prevents back flow of resin downstream from the injection port 5 toward the actuator valve 4, thereby protecting the equipment and piping from having catalized resin settle and harden on their components.

When pump 3 is actuated, actuator valve 9 in the catalyst flow line is also opened, thus enabling catalyst to flow to injection port 5. Flow manager microcontroller 6 engages catalyst pump 8 upon operation of resin pump 3, drawing catalyst from the catalyst source through catalyst flow line 13. A suitable catalyst pump is commercially available from Micropump Washington of Vancouver, Wash. under Model No. 5000. This is designed to handle catalyst transfer in a flow range of 2.5–10 lbs/min, with a discharge pressure of 100 PSIG, ½ horsepower, 1750 RPM, TEFC motor with adjustable variable speed drive. Flow manager microcontroller 6 delivers a 4–20 ma output signal to a slave controller 37, which in response thereto delivers a driving signal to pump 8. Catalyst is emitted from pump 8 into catalyst flow line 14 to actuator valve 9, and onward through flow line 15 to flow meter 10. Line 28 directs an electrical signal from flow meter 10 to slave controller 37 which is representative of the actual flow of catalyst through flow meter 10. Slave controller 37 simultaneously receives a driving signal from flow manager microcontroller 6 and sends a driving signal on the pump 8 to adjust catalyst flow as necessary to maintain a proper proportion of catalyst flow to resin flow. Flow meter 10 may also direct a signal to control panel 38 to provide an indication of a premature termination of fluid flow through the secondary catalyst flow line for some predetermined period of time. When that indication is sensed, the flow manager microcontroller 6 may either automatically shut down the entire system or allow an operator to manually do so until the secondary catalyst flow is restored.

Catalyst is then emitted from flow meter 10 into flow line 16, past another backflow protector 35A sized for the appropriate line diameter of the secondary flow (i.e., ¼" in the present embodiment), and is directed to injection port 5. Injection port 5 preferably comprises a ¼ inch stainless steel ball valve having a female connector which receives an injection tube. The ball valve is opened and the injection tube inserted into the primary flow line, with openings in the injection tube facing downstream in the primary flow line. The female connector of the injection ball valve is provided with a notch which receives a notched flange on the injection tube in order to ensure proper alignment of the injection holes in the primary flow line. Following the injection of catalyst into the resin flow line, the combined mixture of flows may continue on to a mixer and dispenser. A variety of suitable mixer/dispensers exist. A static mixing unit has advantages over dynamic agitators, and Koch Engineering™ of Wichita, Kans., carries an ample array of suitable static mixers.

B. Flow Manager Microcontroller 6

The resin flow path and the catalyst flow path are electrically interconnected through flow manager microcontroller 6 and slave controller 37 such that the catalyst pump 8 flow rate is constantly maintained at an appropriate proportional level to that of the resin flow rate. Proportional flow rates are maintained by the flow manager microcontroller 6 throughout system operation. While numerous flow manager microcontrollers are commercially available, the present invention preferably employs a "VIKING FLOW MANAGER®" from Viking Pump, Inc. of Cedar Falls, Iowa, which is the subject of U.S. Pat. No. 4,965,713 to Hong et al. entitled "Terminal Element," the disclosure of which is incorporated by reference in its entirety herein. Flow manager microcontroller 6 can be configured from the front panel, the host computer or an IBM-compatible PC. An operator sets the parameters (to be described).

The flow manager microcontroller 6 uses an algorithm to monitor the operating conditions of resin pump 3, accurately calculate the resin flow rate, and output a driving signal to slave controller 37 to control the speed of catalyst pump 8 to maintain the desired proportional flow of catalyst to the current resin flow rate. The algorithm is set forth in more detail in the specification of the above-referenced '713 patent.

The resin flow line and pump 3 are equipped with several sensors 18, 19, 20 and 21 which constantly detect all critical resin flow line characteristics and forward these data through their respective data lines 23, 24, 25 and 26 to flow manager microcontroller 6. Sensor 18 measures pump inlet pressure. Sensors 20 and 21 measure pump outlet temperature and pressure, respectfully. Sensor 19 measures pump 5 rotations per minute (RPM's). Each of these data serve as data inputs to the flow manager microcontroller, 6. A suitable temperature sensor 20 is commercially available from MINCO of Minneapolis, Minn., as set forth in their published bulletin TS-102. Suitable pressure sensors 18, 21 are commercially available from Wika Instrument Corporation of Lawrenceville, Ga. under Model No. 891.13.520, as described in their published document No. APE 81.02. Further, suitable Hall-effect motor speed sensors 19 are commercially available from Electro-Sensors, Inc. under Series DRK.

With reference to FIG. 1, a first line 23 is electrically connected between a resin pump inlet pressure sensor 18 and microcontroller 6. Line 23 transmits output representative of the actual resin flow pressure as it enters pump 3 to microcontroller 6. A second line 25 is electrically connected between a resin pump outlet temperature sensor 20 and microcontroller 6, and a third line 26 is electrically connected between a resin pump outlet pressure sensor 21 and microcontroller 6. Lines 25 and 26 similarly transmit outputs representative of the actual resin temperature and flow pressure as it exits pump 3 to microcontroller 6. A fifth line 24 is electrically connected between a resin pump motor speed sensor 19 and microcontroller 6 which transmits an output representative of the actual RPM's of the pump motor. Thus, the total data inputs to microcontroller 6 during system operation are from resin pump inlet pressure sensor 18, resin pump outlet temperature sensor 20, resin pump outlet pressure sensor 21, and resin pump motor speed sensor 19. These data inputs are connected to the appropriate (namesake) input terminals of the microcontroller 6 as depicted in the published "Viking Flow Manager® flow control system" brochure at page 4.

Other critical system data may be manually input to the flow manager microcontroller 6 through a manual input device 36 which may be any conventional operator keypad entry device or personal computer, the Viking Flow Manager® having the built-in capability of interfacing with either. This additional system data includes pump and pump drive information, comprising pump model designation, cycles/revolution of the pump speed sensor, minimum and maximum pump recalibration speeds, nameplate motor speed, power line frequency, and the drive reduction ratio. This information allows the microprocessor to calculate the pump's nominal pump speed. Other system data which is manually input to the microprocessor includes the weights and specific gravities of the resin, the gain ratio of resin to catalyst, alarm points for resin flow line temperatures and pressures, and differential pressure settings for the resin pump. The specific fluid information allows the microprocessor to continuously calculate the monitored fluid's viscosity based on a temperature/viscosity relationship which is input by the system operator. The operator enters a viscosity at a first temperature, and a viscosity at a second temperature. Thus, the wide range of viscosities that result from the logarithmic relationship between viscosity and temperature may be narrowed by defining a specific operating range of temperatures for the monitored fluid. The microprocessor will continuously monitor fluid temperature from sensor 20 and instantaneously calculate fluid viscosity or specific gravity in order to properly proportion the secondary flow rate.

The processing of this variety of data allows for the mixing and dispensing of two or more fluids in a prescribed mix ratio until a batch or steady state rate is attained, regardless of changes in system fluid characteristics.

Referring next to the catalyst flow path depicted at the bottom of FIG. 1, a fifth line 28 is connected between flow meter 10 and a slave controller 37, which in turn directs the speed of a variable frequency drive for the motor of catalyst pump 8. A suitable slave controller is commercially available from AGG Kent-Taylor Inc. of Rochester, N.Y. under Model "Commander 200™." Line 28 transmits an output representative of the actual flow of catalyst from catalyst flow meter 10 to slave controller 37.

As explained in the specification of U.S. Pat. No. 4,965,713, the inputs to microcontroller 6 are processed in order to determine the appropriate output signal to send to catalyst pump 8 in order to maintain a proper proportional flow of catalyst to resin. To this end, microcontroller 6 transmits a catalyst pump motor driving signal through line 27a to slave controller 37. The input from the microprocessor is received as a proportional number. The slave controller simultaneously receives a 4–20 mA signal from flow meter 10 which is then compared to the microcontroller output, thus establishing the proper output to the variable speed drive of the motor for pump 8. Through this configuration, the microcontroller output can provide a nearly instantaneous signal to pump 8 responsive to a change in the primary fluid conditions, such that a properly proportioned flow rate may always be maintained.

This system configuration enables a system operator to start a dispensing operation from zero flow rate because initiation of pumping resin through pump 3 will immediately initiate catalyst flow through pump 8 at the proper proportion to the resin flow rate. By simply regulating the primary resin flow stream and adjusting that primary stream to whatever flow is desired by the system operator, the secondary flow of catalyst is instantaneously adjusted so as to maintain a properly proportioned flow. Further, by analyzing all critical primary resin flow characteristics, including pump inlet and outlet pressures, outlet temperature, pump RPM's, pump characteristics, and primary fluid characteristics, the current system is able to appropriately adjust the catalyst flow rate to maintain precisely the required proportional flow of catalyst for changes in fluid temperature, pressures, viscosities, specific gravity, and even degradation of pump components from normal wear.

C. System Calibration

The Viking Flow Manager® can be activated to initiate a system calibration mode wherein the operator manually inputs parameters for the calibration of all sensors.

In order to achieve system calibration, the system operator follows the steps of: 1) pumping a theoretical amount of fluid for a predetermined amount of time, and weighing the accumulated fluid; 2) comparing the theoretical mass of fluid expected with the actual mass of fluid obtained; 3) adjusting the gain of the microcontroller output signal as required; and 4) repeating the previous three steps until a desired repeatability or acceptable error is obtained. This series of steps is used for calibration of each individual flow line.

D. System Operation

Following system calibration, normal operation may proceed as follows. Pump 3 is initiated to draw resin through flow line 2 and the remainder of the resin flow path to injection port 5. Pump 8 is simultaneously initiated to draw catalyst through flow line 13, through the catalyst flow path to flow meter 10, and on to injection port 5 to be combined with the resin flow. As resin is pumped through pump 3, microcontroller 6 collects outlet temperature and differential pressure data and motor speed data from resin pump 3. These signals are processed through microcontroller 6 to produce an essentially real-time signal through line 27*a* to a slave controller 37 and onward to a variable frequency drive for the motor of pump 8, sending catalyst through the catalyst flow lines to flow meter 10. Because the catalyst flow meter is connected through line 28 to slave controller 37, which in turn is connected through line 27*a* to microcontroller 6, a signal representative of catalyst flow therethrough is transmitted to slave controller 37 almost immediately upon actuation of microprocessor 6, resin pump 3 and catalyst pump 8. This in turn establishes a feedback circuit between the slave controller, catalyst pump 8 and flow meter 10 so as to always maintain the catalyst flow at the level that is designated from the microcontroller 6. Thus, a precisely accurate, proportional amount of catalyst is allowed to flow through the catalyst flow lines to injection port 5, providing a properly proportioned mixture of fluids from the start of the mixing process. Further, in the same manner the system will continue to adjust the flow of catalyst in response to any variation in critical fluid characteristics in the primary resin flow, such that a nearly instantaneous automatic adjustment is made to the catalyst flow in response to adjustments of the primary resin flow to maintain the flows at the proper proportional levels.

E. System Portability

One of the main features of the present invention is its compact configuration which allows it to be easily transported to the CIPP site or any other field location. In the CIPP context, this is important since the piping systems must be repaired on-site through the application of resin compounds to damaged pipe surfaces while the pipes remain buried underground.

Figure 2:
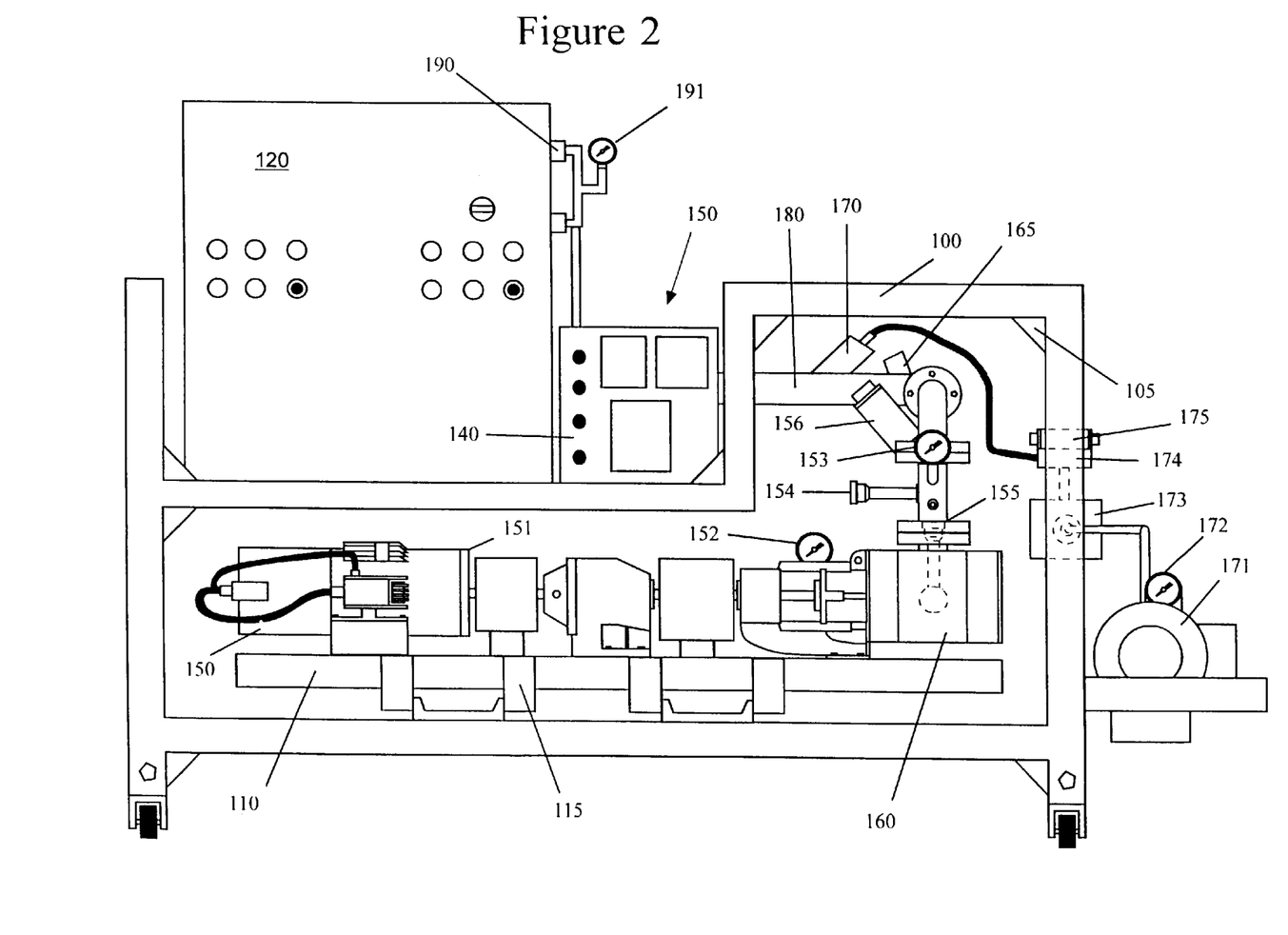
FIG. 2 is a front perspective view of the apparatus of the invention.

FIG. 2 is a front perspective view of the apparatus of the invention. All components are mounted on a substantially open steel framework 100 formed of welded rectangular tubing with reinforcing corner brackets 105. The pump and valve components are elevated on a rectangular bed 110 which is supported by risers 115. The spaces between adjacent risers 115 create openings for receiving the skids of a fork lift or other lifting device so as to easily remove the entire resin pump and motor assembly from frame 100. Castors are included on the supporting legs so that the assembly can be wheeled into position. The castors are adjustable to allow the entire structure to be leveled at a site having nonuniform grading. The castors may also be removed if needed to lower the entire structure. Bed 110 can be detached from framework 100. This way, the main motor, gearbox and pump can be removed from framework 100, thereby helping to ensure the proper flooded suction from the source of resin (e.g., bulk tank, tank wagon, totes and/or drums).

Figure 3:
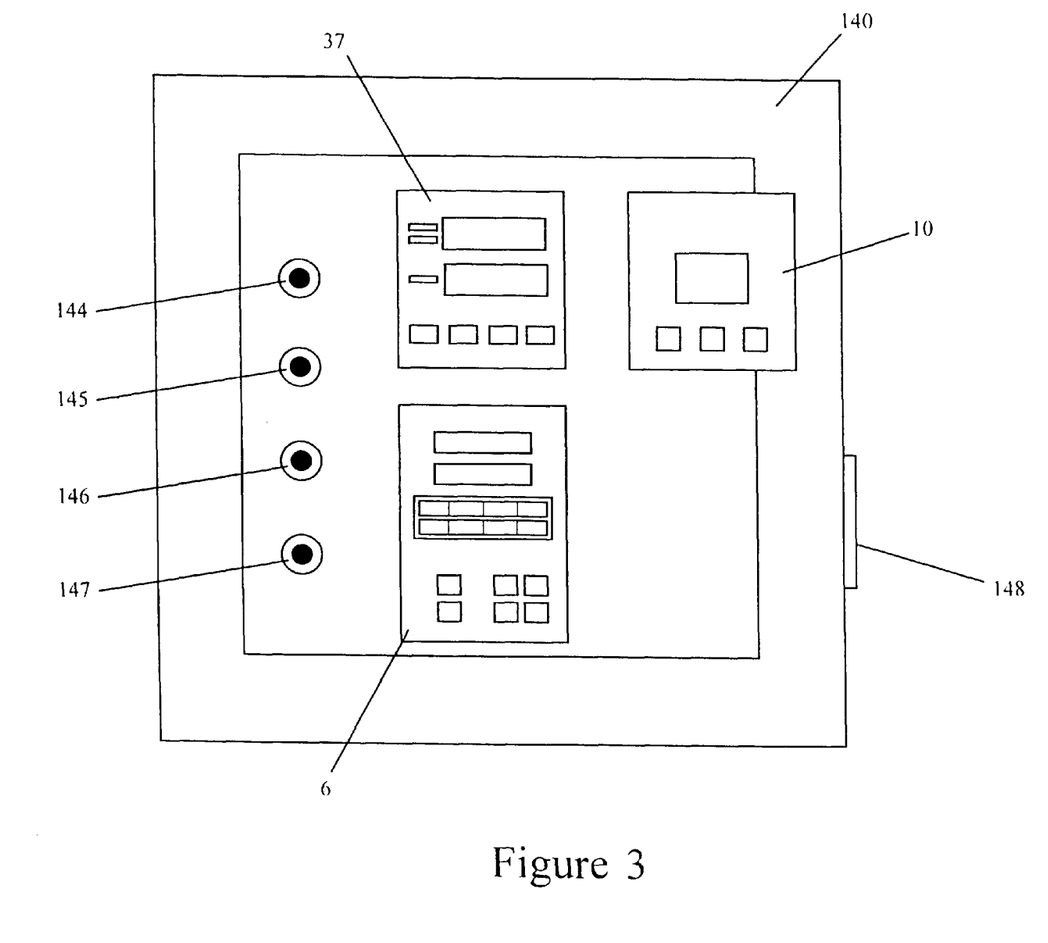
FIG. 3 is a front perspective view of the control panel of the present invention.

The manual pump controls and primary electrical unit are enclosed within a housing 120 that sits in an alcove atop the framework 100. Control panel 140 is seated in the same alcove atop the framework 100 at opening 150. As shown in the front perspective view of the control panel of the present invention of FIG. 3, control panel 140 frontally exposes the front panel of the flow manager microcontroller 6, slave controller 37, and catalyst flow meter 10. Also housed within control panel 140 are the controls for the electric control system, comprising circuit breaker 144, reset control switch 145, stop/pause control switch 146, and start control switch 147. A serial input/output port 148 is provided on one side of control panel 140 allowing the electronic control system to be remotely operated and monitored through the connection of an external computer. The control panel may likewise be removed from framework 100, allowing reprogramming of the flow controller 6 or the like, and ensuring that the control panel will not be damaged by tampering or harsh weather conditions. The control panel is used during the system cleaning process or under pumping conditions in which a programmable process is not required.

F. Addition of Multiple Viscous Fluids

The above-described embodiment can easily be adapted for use as a multiple viscous fluid metering system simply by adding additional flow paths and corresponding material sources.

Figure 4:
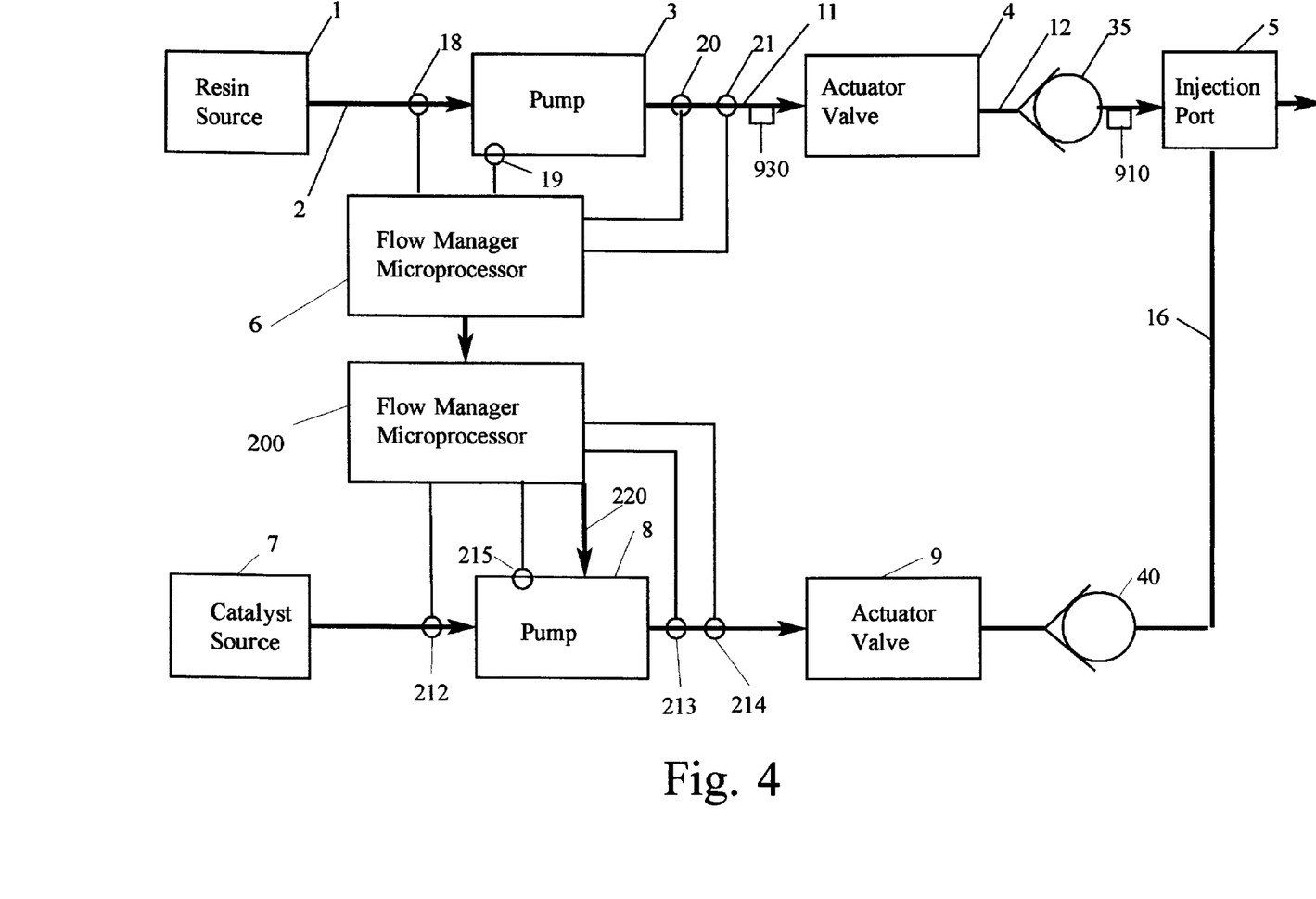
FIG. 4 is a schematic block diagram of a second embodiment of the apparatus of this invention.

Shown in FIG. 4 is a second embodiment of the present invention in which the secondary fluid comprises a highly viscous reactive fluid. In this case, the secondary fluid will retain all of the measurement and control problems of the primary fluid, causing greater difficulty in maintaining a proportional flow to the primary fluid. In this embodiment, the ABB slave controller is simply replaced by another flow manager microprocessor 200. Flow manager microprocessor 200 receives the same proportional output signal from microprocessor 6 as would have gone to the slave controller 37 for a non-viscous fluid. Microprocessor 200 also receives data from the secondary pump, which is configured with an inlet pressure sensor 212, an RPM sensor 215, an outlet pressure sensor 213, and an outlet temperature sensor 214. While monitoring the flow conditions of the secondary fluid, microprocessor 200 sends a 4–20 mA output signal to the variable frequency drive of pump 8 through line 220 to maintain the secondary flow output at the properly proportioned level as designated by primary flow manager 6. Thereafter, the secondary fluid continues through the secondary flow actuator valve 9, and onward through backflow protector 40 and flow line 16 to injection port 5 where it is combined with the primary flow.

Figure 5:
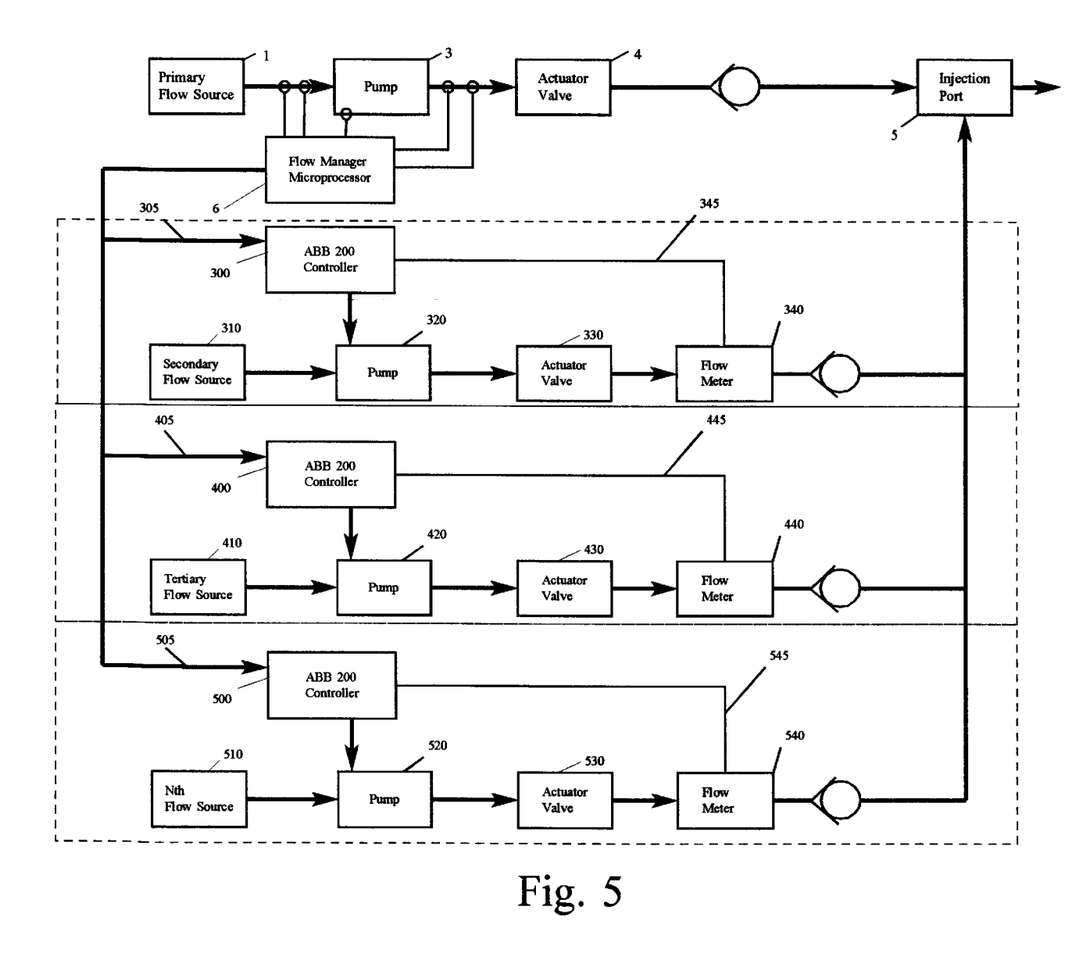
FIG. 5 is a schematic block diagram of a third embodiment of the apparatus of this invention.

The present invention is also adaptable to pumping operations having any number of fluids. FIG. 5 shows another embodiment of the invention in which any number of non reactive fluids may be combined with a primary fluid. A secondary flow line comprises a secondary flow source 310, secondary pump 320, actuator valve 330, and flow meter 340. As in the first embodiment, the secondary flow is monitored by flow meter 340 which directs a signal through line 345 indicative of the actual flow of the secondary fluid to slave controller 300. Slave controller 300 also receives an output signal from microcontroller 6 through line 305. Slave controller 300 then compares the flow meter signal with the microprocessor output to determine the proper control signal to deliver to the variable frequency drive of the motor for pump 320 in order to control the flow rate of the secondary fluid and maintain the flow rate at a level that is properly proportioned to the primary fluid flow rate. The output from microprocessor 6 is simultaneously delivered to tertiary slave controller 400, and onward up to the $n^{th}$ slave controller 500. Each slave controller may thus compare the driving signal from microprocessor 6 with the actual flow in its respective flow line in order to determine the properly proportioned signal to forward to the variable frequency drives for the pump in each line. Each of the non-primary flows then join together in line 16, from which they are delivered through injection port 5 and combined with the primary fluid source.

Figure 6:
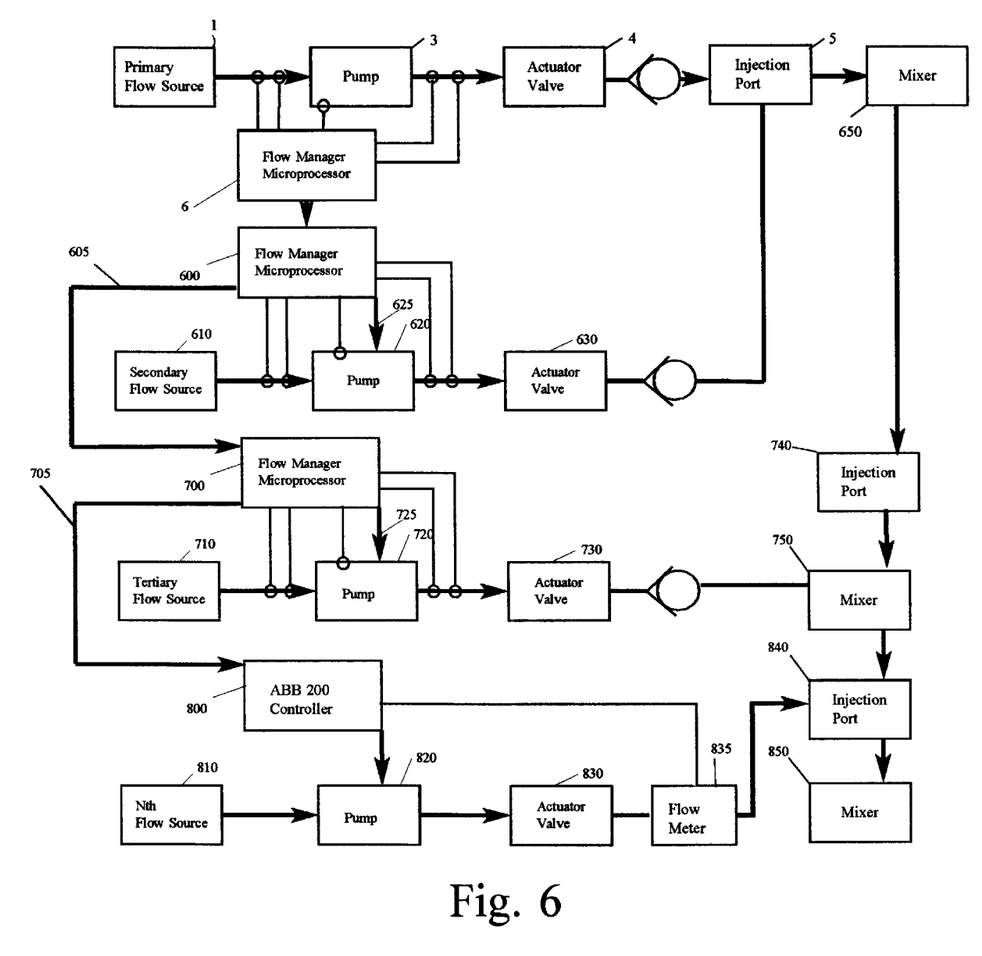
FIG. 6 is a schematic block diagram of a fourth embodiment of the apparatus of this invention.

FIG. 6 shows yet another embodiment of the invention in which any number of highly reactive or viscous flows are proportionately combined. As shown in FIG. 6, the output from the primary microprocessor 6 is directed to a secondary microprocessor 600, which simultaneously monitors the flow conditions of the secondary fluid through pump 620. As in the second embodiment of the invention, secondary microprocessor 600 compares the flow characteristics of the fluid through pump 620 with the driving signal from microprocessor 6 in order to determine the appropriate output signal to deliver through line 625 to the variable frequency drive of pump 620, such that the secondary flow is maintained at a level that is properly proportioned to the primary flow. Secondary microprocessor 600 also delivers an output signal to tertiary microprocessor 700, and onward to the $n^{th}$ flow line which includes a slave controller 800. Thus, each additional microprocessor receives a properly proportioned driving signal from the previous microprocessor, against which it compares the flow characteristics of the flow through its respective pump. Each microprocessor then delivers both a properly proportioned driving signal to the appropriate pump, and a driving signal to the next succeeding microprocessor. Injection ports 5, 740 are provided for combining two flows at a time, after which the injected fluid is delivered to mixers 650, 750 and onward to the next injection port. The nth flow is provided a slave controller 800, or alternatively an additional microcontroller, which receives a proportioned driving signal from the previous microprocessor through line 705, compares that signal with the actual flow of the $n^{th}$ fluid as indicated by flow meter 835, and delivers a properly proportioned driving signal to the variable frequency drive of pump 820. The final flow is then combined with all earlier flows in injection port 840, and from there onward to a final mixer 850.

Thus, as shown in FIGS. 4 through 6, the current system is adaptable to any pumping operation such that it can be used with any number of fluids of any viscosity while ensuring a precisely accurate mixing ratio of those fluids.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

What is claimed is:

1. An apparatus for intermixing multiple fluids of varied viscosities while maintaining a prescribed proportion of each of said fluids in a final mixture, said apparatus comprising:

a first fluid source having a first fluid therein susceptible to changes in viscosity;

a second fluid source having a second fluid therein;

a fluid combining chamber in fluid communication with each of said first and second fluid sources for combining said first and second fluids in a prescribed proportion;

a first fluid flow conduit for channeling said first fluid from said first fluid source to said fluid combining chamber;

a second fluid flow conduit for channeling said second fluid from said second fluid source to said fluid combining chamber;

a first sensor means connected to said first fluid flow conduit between said first fluid source and said combining chamber, said first sensor means continuously producing a combination of first signals which in combination are representative of the flow rate and temperature of said first fluid;

a second sensor means connected to said second fluid flow conduit between said second fluid source and said combining chamber, said second sensor means continuously producing at least one second signal representative of the flow rate of said second fluid;

a first control means having a pre-determined logarithmic temperature/viscosity relationship stored therein, said first control means receiving said combination of first signals from said first sensor means, and said first control means calculating a viscosity correction and generating a first control signal proportioned to the viscosity-corrected flow rate of said first fluid in accordance with said prescribed proportion;

a second control means receiving said at least one second signal from said second sensor means, said second control means also receiving said first control signal from said first control means, said second control means comparing said at least one second signal and said first control signal and further generating a driving signal for regulating fluid flow in said second fluid flow conduit, said driving signal being sufficient to maintain said second fluid flow in the prescribed relative proportion to said first fluid flow irrespective of viscosity changes in said first fluid flow.

2. The apparatus for intermixing multiple fluids of varied viscosities while maintaining a prescribed proportion of each of said fluids in a final mixture of claim 1, said first control means further comprising a memory, said memory having said pre-determined logarithmic temperature/viscosity relationship stored therein.

3. The apparatus for intermixing multiple fluids of varied viscosities while maintaining a prescribed proportion of each of said fluids in a final mixture of claim 2, said apparatus further comprising:

a first pump on said first fluid flow conduit positioned between said first fluid source and said fluid combining chamber for directing said first fluid from said first fluid source to said fluid combining chamber;

said first sensor means further comprising:
a pump inlet pressure sensor generating a signal representative of the pressure of said first fluid as it enters said first pump;
a pump outlet pressure sensor generating a signal representative of the pressure of said first fluid as it exits said first pump;
a pump temperature sensor generating a signal representative of the temperature of said first fluid in said first pump; and
a motor sensor generating a signal representative of the rotational speed of said first pump;

each of said pump inlet pressure sensor, pump outlet pressure sensor, pump temperature sensor, and motor sensor being electrically connected to said first control means and directing each of their respective signals to said first control means, said first control means calculating the flow rate of said first fluid from the combination of said respective signals and generating said first control signal in proportion to said respective signals.

4. The apparatus for intermixing multiple fluids of varied viscosities while maintaining a prescribed proportion of each of said fluids in a final mixture of claim 3, said apparatus further comprising:

a second pump on said second fluid flow conduit positioned between said second fluid source and said fluid combining chamber for directing said second fluid from said second fluid source to said fluid combining chamber;

said driving signal from said second control means driving said second pump to maintain the flow rate of said second fluid at the prescribed proportion to the flow rate of said first fluid.

5. The apparatus for intermixing multiple fluids of varied viscosities while maintaining a prescribed proportion of each of said fluids in a final mixture of claim 4, said apparatus further comprising:

a plurality of additional fluid sources equal to a number n, each of said n fluid sources having a distinct fluid therein;

a number n of additional fluid flow conduits for channeling said plurality of additional fluids from said additional fluid sources to said fluid combining chamber;

an additional sensor means connected to each of said additional fluid flow conduits between each of said additional fluid flow sources and said combining chamber, said additional sensor means continuously producing at least one additional signal representative of the flow rate of said additional fluid; and a number n of additional control means, each additional control means receiving one of said signals representative of the flow rate of each said additional fluid from one of said additional sensor means, said additional control means also receiving said first control signal from said first control means, said additional control means comparing each respective additional signal and said first control signal and further generating an additional driving signal for regulating fluid flow in each respective additional fluid flow conduit, said additional driving signal being sufficient to maintain said additional fluid flow in the prescribed relative proportion to said first fluid flow irrespective of flow rate, viscosity, pressure, or temperature changes in said first fluid flow.

6. The apparatus for intermixing multiple fluids of varied viscosities while maintaining a prescribed proportion of each of said fluids in a final mixture of claim 5, said apparatus further comprising:

an additional pump on each said additional fluid flow conduit positioned between said additional fluid source and said fluid combining chamber for directing each said additional fluid from said additional fluid source to said fluid combining chamber;

said driving signal from each said additional control means driving said additional pump to maintain the flow rate of said additional fluid at the prescribed proportion to the flow rate of said first fluid.

7. The apparatus for intermixing multiple fluids of varied viscosities while maintaining a prescribed proportion of each of said fluids in a final mixture of claim 3, said second fluid being susceptible to changes in viscosity, said apparatus further comprising:

a second pump on said second fluid flow conduit positioned between said second fluid source and said fluid combining chamber for directing said second fluid from said second fluid source to said fluid combining chamber;

said second sensor means further comprising:
a second pump inlet pressure sensor generating a signal representative of the pressure of said second fluid as it enters said second pump;
a second pump outlet pressure sensor generating a signal representative of the pressure of said second fluid as it exits said second pump;
a second pump temperature sensor generating a signal representative of the temperature of said second fluid in said second pump; and
a second motor sensor generating a signal representative of the rotational speed of said second pump;

each of said second pump inlet pressure sensor, second pump outlet pressure sensor, second pump temperature sensor, and second motor sensor being electrically connected to said second control means and directing each of their respective signals to said second control means, said second control means calculating the flow rate of said second fluid from the combination of said respective signals;

said second control means comparing the flow rate of said second fluid and said first control signal, and further generating a driving signal for regulating fluid flow in said second fluid flow conduit, said driving signal being sufficient to maintain said second fluid flow in the prescribed relative proportion to said first fluid flow irrespective of flow rate, viscosity, pressure, or temperature changes in said first and second fluid flows.

8. The apparatus for intermixing multiple fluids of varied viscosities while maintaining a prescribed proportion of each of said fluids in a final mixture of claim 7, said apparatus further comprising:

a plurality of additional fluid sources equal to a number n, each of said n fluid sources having a distinct fluid therein being susceptible to changes in viscosity;

a number n of additional fluid flow conduits for channeling said plurality of additional fluids from said additional fluid sources to said fluid combining chamber;

an additional sensor means connected to each of said additional fluid flow conduits between each of said additional fluid flow sources and said combining chamber, each said additional sensor means continuously producing an additional signal representative of the flow rate of said additional fluid;

a number n of additional control means, each additional control means receiving one of said additional signals representative of the flow rate of each said additional fluid from one of said additional sensor means;

an additional pump on each said additional fluid flow conduit positioned between said additional fluid source and said fluid combining chamber for directing said additional fluid from said additional fluid source to said fluid combining chamber;

each said additional sensor means further comprising:
an additional pump inlet pressure sensor generating a signal representative of the pressure of said additional fluid as it enters said additional pump;
an additional pump outlet pressure sensor generating a signal representative of the pressure of said additional fluid as it exits said additional pump;
an additional pump temperature sensor generating a signal representative of the temperature of said additional fluid in said additional pump;
an additional motor sensor generating a signal representative of the rotational speed of said additional pump;
each of said additional pump inlet pressure sensor, additional pump outlet pressure sensor, additional pump temperature sensor, and additional motor sensor being electrically connected to said additional control means and directing each of their respective signals to said additional control means, said additional control means calculating the flow rate of said additional fluid from the combination of said respective signals;
each of said control means being arranged in series;
each of said additional control means comparing the flow rate of its respective fluid and the control signal from the previous control means in series, and further generating a driving signal for regulating fluid flow in said additional fluid flow conduit, said driving signal being sufficient to maintain the respective additional fluid flow in the prescribed relative proportion to said first fluid flow irrespective of flow rate, viscosity, pressure, or temperature changes in any of said fluid flows;
each of said additional control means excepting the last control means in series simultaneously generating a supplementary control signal proportioned to the flow rate of the previous fluid in series in accordance with said prescribed proportion, each said supplementary control signal serving as the control signal for the next additional control means in series.

9. An apparatus for maintaining the flow rate of a first fluid flow from a first fluid source at a prescribed proportion to the flow rate of at least one additional fluid flow from at least one additional fluid source, said first fluid having a variable flow rate caused by variations in the viscosity of said first fluid, the apparatus comprising:

a first flow rate sensor means continuously producing a combination of first signals which in combination are representative of the flow rate and temperature of said first fluid;

a second flow rate sensor means continuously producing at least one second signal which is representative of the flow rate of said second fluid;

a first control means receiving said combination of first signals from said first flow rate sensor means, said first control means having a pre-determined logarithmic temperature/viscosity relationship stored therein, said first control means calculating a viscosity correction and generating a first control signal proportioned to the viscosity-corrected flow rate of said first fluid in accordance with said prescribed proportion;

a second control means receiving said at least one second signal from said second flow rate sensor means, said second control means also receiving said first control signal from said first control means, said second control means comparing said second signal and said first control signal and further generating a driving signal for regulating a flow rate of said second fluid, said driving signal being sufficient to maintain said second fluid flow in the prescribed relative proportion to said first fluid flow irrespective of viscosity changes in said first fluid flow.

10. The apparatus for maintaining the flow rate of a first fluid flow from a first fluid source at a prescribed proportion to the flow rate of at least one additional fluid flow from at least one additional fluid source of claim 9, said first control means further comprising a memory, said memory having said pre-determined logarithmic temperature/viscosity relationship stored therein.

11. The apparatus for maintaining the flow rate of a first fluid flow from a first fluid source at a prescribed proportion to the flow rate of at least one additional fluid flow from at least one additional fluid source of claim 10, said apparatus further comprising:

a first pump in fluid communication with said first fluid source;

said first flow rate sensor means further comprising:
a pump inlet pressure sensor generating a signal representative of the pressure of said first fluid as it enters said first pump;
a pump outlet pressure sensor generating a signal representative of the pressure of said first fluid as it exits said first pump;
a pump temperature sensor generating a signal representative of the temperature of said first fluid in said first pump; and
a motor sensor generating a signal representative of the rotational speed of said first pump;
each of said pump inlet pressure sensor, pump outlet pressure sensor, pump temperature outlet sensor, and motor sensor being electrically connected to said first control means and directing each of their respective signals to said first control means, said first control means calculating the flow rate of said first fluid from the combination of said respective signals and generating said first control signal in proportion to said respective signals.

12. The apparatus for maintaining the flow rate of a first fluid flow from a first fluid source at a prescribed proportion to the flow rate of at least one additional fluid flow from at least one additional fluid source of claim 11, said apparatus further comprising:

a second pump in fluid communication with said second fluid source;

said driving signal from said second control means driving said second pump to maintain the flow rate of said second fluid at the prescribed proportion to the flow rate of said first fluid.

13. The apparatus for maintaining the flow rate of a first fluid flow from a first fluid source at a prescribed proportion to the flow rate of at least one additional fluid flow from at least one additional fluid source of claim 12, said apparatus further comprising:

a plurality of additional fluid flow rate sensor means equal to a number n, said plurality of additional fluid flow rate sensor means continuously producing at least one additional signal representative of the flow rate of said additional fluid; and a number n of additional control means, each additional control means receiving one of said signals representative of the flow rate of each said additional fluid from one of said additional sensor means, said additional control means also receiving said first control signal from said first control means, said additional control means comparing each respective additional signal and said first control signal and further generating an additional driving signal for regulating a flow rate of each respective additional fluid, said additional driving signal being sufficient to maintain said additional fluid flow in the prescribed relative proportion to said first fluid flow irrespective of flow rate, viscosity, pressure, or temperature changes in said first fluid flow.

14. The apparatus for maintaining the flow rate of a first fluid flow from a first fluid source at a prescribed proportion to the flow rate of at least one additional fluid flow from at least one additional fluid source of claim 13, said apparatus further comprising:

an additional pump in fluid communication with each additional said fluid source;

said driving signal from each said additional control means driving said additional pump to maintain the flow rate of said additional fluid at the prescribed proportion to the flow rate of said first fluid.

15. The apparatus for maintaining the flow rate of a first fluid flow from a first fluid source at a prescribed proportion to the flow rate of at least one additional fluid flow from at least one additional fluid source of claim 11, said second fluid being susceptible to changes in viscosity, said apparatus further comprising:

a second pump in fluid communication with said second fluid source;

said second sensor means further comprising:

a second pump inlet pressure sensor generating a signal representative of the pressure of said second fluid as it enters said second pump;

a second pump outlet pressure sensor generating a signal representative of the pressure of said second fluid as it exits said second pump;

a second pump temperature sensor generating a signal representative of the temperature of said second fluid in said second pump; and a second motor sensor generating a signal representative of the rotational speed of said second pump;

each of said second pump inlet pressure sensor, second pump outlet pressure sensor, second pump temperature sensor, and second motor sensor being electrically connected to said second control means and directing each of their respective signals to said second control means, said second control means calculating the flow rate of said second fluid from the combination of said respective signals;

said second control means comparing the flow rate of said second fluid and said first control signal, and further generating a driving signal for regulating a flow rate of said second fluid, said driving signal being sufficient to maintain said second fluid flow in the prescribed relative proportion to said first fluid flow irrespective of flow rate, viscosity, pressure, or temperature changes in said first and second fluid flows.

16. The apparatus for maintaining the flow rate of a first fluid flow from a first fluid source at a prescribed proportion to the flow rate of at least one additional fluid flow from at least one additional fluid source of claim 15, said apparatus further comprising:

a plurality of additional fluid flow rate sensor means equal to a number n, each of said additional fluids being susceptible to changes in viscosity, each said additional fluid flow rate sensor means continuously producing an additional signal representative of the flow rate of its respective additional fluid;

a number n of additional control means, each additional control means receiving one of said additional signals representative of the flow rate of each said additional fluid from one of said additional sensor means;

an additional pump in fluid communication with each additional said fluid source;

each said additional sensor means further comprising:

an additional pump inlet pressure sensor generating a signal representative of the pressure of said additional fluid as it enters said additional pump;

an additional pump outlet pressure sensor generating a signal representative of the pressure of said additional fluid as it exits said additional pump;

an additional pump temperature sensor generating a signal representative of the temperature of said additional fluid in said additional pump;

an additional motor sensor generating a signal representative of the rotational speed of said additional pump;

each of said additional pump inlet pressure sensor, additional pump outlet pressure sensor, additional pump temperature sensor, and additional motor sensor being electrically connected to said additional control means and directing each of their respective signals to said additional control means, said additional control means calculating the flow rate of said additional fluid from the combination of said respective signals;

each of said control means being arranged in series;

each of said additional control means comparing the flow rate of its respective fluid and the control signal from the previous control means in series, and further generating a driving signal for regulating a flow rate of said additional fluid, said driving signal being sufficient to maintain the respective additional fluid flow in the prescribed relative proportion to said first fluid flow irrespective of flow rate, viscosity, pressure, or temperature changes in any of said fluid flows;

each of said additional control means excepting the last control means in series simultaneously generating a supplementary control signal proportioned to the flow rate of the previous fluid in series in accordance with said prescribed proportion, each said supplementary control signal serving as the control signal for the next additional control means in series.

17. A method for maintaining the flow rate of a first fluid flow from a first fluid source at a prescribed proportion to the flow rate of a second fluid flow from a second fluid source comprising the steps of:

measuring an instantaneous differential pressure and temperature of said first fluid and a motor speed of a first pump pumping said first fluid;

calculating an instantaneous flow rate of said first fluid from said instantaneous differential pressure and temperature of said first fluid and the motor speed of said first pump;

generating a first control signal proportional to said first fluid flow rate, the proportionality of said first control signal to the flow rate of said first fluid being equivalent to the prescribed proportion;

measuring an instantaneous flow rate of said second fluid;

comparing said flow rate of said second fluid with said control signal proportional to said first fluid flow rate; and generating a driving signal to drive said flow of said second fluid at a flow rate equivalent to said first control signal to maintain said second fluid flow rate at the prescribed proportion to said first fluid flow rate.

18. A method for maintaining the flow rate of a first fluid flow from a first fluid source at a prescribed proportion to the flow rate of a second fluid flow from a second fluid source comprising the steps of:

measuring an instantaneous differential pressure and temperature of said first fluid and a motor speed of a first pump pumping said first fluid;

directing a signal representative of said instantaneous differential pressure and temperature of said first fluid and the motor speed of said first pump to a first control means, and calculating an instantaneous flow rate of said first fluid from said instantaneous differential pressure and temperature of said first fluid and the motor speed of said first pump;

generating a first control signal proportional to said first fluid flow rate, the proportionality of said first control signal to the flow rate of said first fluid being equivalent to the prescribed proportion;

directing said first control signal from said first control means to a second control means;

measuring an instantaneous flow rate of said second fluid;

directing a signal representative of said instantaneous flow rate of said second fluid to said second control means;

comparing said signal representative of said instantaneous flow rate of said second fluid with said first control signal; and generating a driving signal to drive said flow of said second fluid at a flow rate equivalent to said first control signal to maintain said second fluid flow rate at the prescribed proportion to said first fluid flow rate.

\* \* \* \* \*